Dec. 6, 1932.   B. J. YANCHENKO   1,890,105
GROUNDING CONNECTER
Filed July 12, 1928

INVENTOR
Basil J. Yanchenko
BY Bohleber & Ledbetter
ATTORNEYS

Patented Dec. 6, 1932

1,890,105

UNITED STATES PATENT OFFICE

BASIL J. YANCHENKO, OF NEW YORK, N. Y., ASSIGNOR TO THE THOMAS & BETTS CO., OF ELIZABETH, NEW JERSEY, A CORPORATION OF NEW JERSEY

GROUNDING CONNECTER

Application filed July 12, 1928. Serial No. 292,206.

This invention relates to electrical connecting means and more particularly to grounding connecters used to tighten a conduit, pipe or other structure in an outlet box and establish a positive electrical ground connection between the pipe and box to eliminate arcing in outlet boxes and thereby prevent danger of fire which is liable to result from the lack of adequate pipe and box joinders.

An object of the invention is to produce a grounding connecter which may be conveniently used with outlet boxes and conduits or cable installations to establish a positive electrical bond or connection between the box and conduit or cable installation and to secure a tight and non-loosening anchorage of the pipe or other structure in the knock-out hole of the electrical outlet box.

A further object is to produce a grounding connecter which may be installed either before or after the electric wires in the box are connected together. For this reason the grounding device is so constructed that it may be inserted in position over the pipe or other structure without removing the anchorage means such as the lock nut which is screwed onto the end of a conduit to anchor the latter in the box hole. The device can, therefore, be used to recondition defective electrical box assemblies and thus establish an electrical bond or connection in old house wiring without disconnecting any of the wiring connections and consequently with a minimum of effort.

Another object is to produce a grounding connecter which may be manufactured from metal punchings or stampings and wherein the threads necessary to install and tighten the device by screw means are also made by a stamping process.

The accompanying drawing illustrates examples of the invention which show the principles involved and wherein.

In house and building work, an outlet box B with knockout holes H are used to receive wires thereinto through a cable or conduit P and a lock nut 1 and bushing nut 2 constitute one suitable form of screw-operated anchorage means to secure the pipe P in the box hole H. In time the pipe becomes loose in the box and rust deteriorates the connection at and around the anchorage means 1—2. This looseness may cause an electrical spark or arc at or in the box and hence constitute a fire hazard. My invention reconditions old box assemblies found in old house work and eliminates this danger. Also it may be used in new house work to totally remove the likelihood of future looseness.

In my invention, I provide two substantially flat metal plates which may be separate members or may be joined together in a single stamping so as to form a hinge and a taper stamped threaded hole, one half of which stamped thread is in one plate and the other half in the other, which is adapted to receive a screw. The plates are positioned side by side with their faces substantially adjacent to each other and having a passage therethrough to receive the conduit or other box assembly structure. The grounding connecter is inserted between the outlet box wall and the box assembly or pipe anchorage means on the conduit and the screw is then screwed into the tapered and threaded hole thereby spreading the two plates apart until they wedge and forcibly engage the box wall on one side and the face of the conduit or other box assembly anchorage means on the other.

Figure 4:
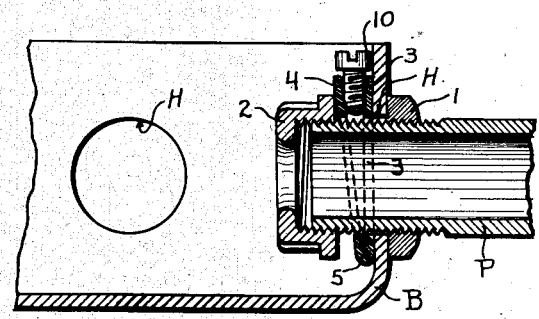
Figure 4 shows a box assembly view in longitudinal section with the new-house work connecter tightened and fixed in final position.
Figure 5:
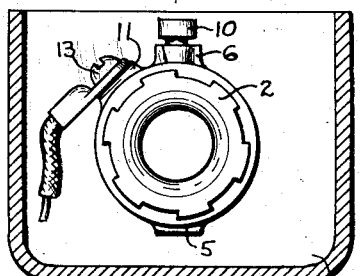
Figure 5 shows an inside box view looking into the pipe end.
Figure 8:
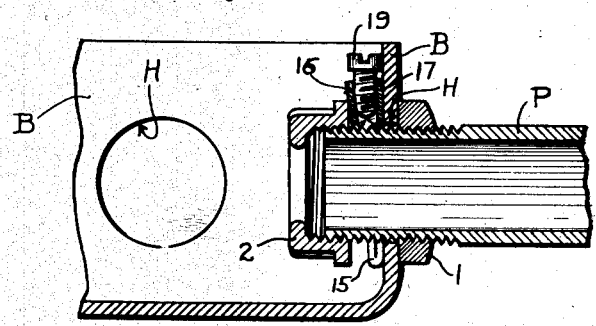
Figure 8 shows a box assembly view of the old-house work grounding connecter of Figures 6 and 7 in longitudinal section with the connecter in position.

Electrical outlet boxes B are made with knock-out openings or holes H to receive a pipe P as shown in Figures 4 and 8 or other box assembly structure, and one method of securing the wire-containing pipe within the knock-out hole H is to thread the end of the pipe and clamp the box wall between a pair of nuts such as a lock nut 1 and bushing nut 2. The wires pass through the pipe and the wires (not shown) are then connected to the lighting or other fixture which is hung from the outlet box. In order to avert danger of short circuits and the consequent sparking therefrom, it is important that a good grounding connection be provided between the outlet box and the pipe. Securing a good electrical connection and a rigid physical connection between the box B and pipe is difficult to obtain due to the fact that the workman has limited space in which to grasp and tighten the nuts and also due to the fact that the outlet boxes may not be overly well secured to the laths in the ceiling or wall. The workman then, in tightening these nuts 1 and 2 must proceed with care for fear that he tear the box from its support. The necessary consequence of this handicap is to leave the nuts loose or at least not sufficiently tight that a good electrical contact between the parts is obtained.

With my invention, a workman leaves the nuts 1 and 2 screwed loosely upon the end of the conduit and then the connecter is inserted and wedged in position between the outlet box wall and the face of one of the nuts thereby securing a positive electrical connection which is tight and moreover a rigid physical connection results.

The form of connecter shown in Figures 1 through 5 is more adapted to be used on new work rather than in old wiring installations where the wires in the latter are already connected. The connecter being of ring form thereby forming a passage therethrough transversely of the rings, it must be slipped over the end of the pipe P before the wires are connected or else the wires must be first disconnected if it is an old wiring installation so that the wires can be inserted through the ring-like connecter and the latter may then be placed over the pipe after which the bushing nut is screwed onto the pipe. Hence this connecter is not particularly well suited for old wiring installations wherein the wires are already connected to the electric fixture leads. Of course the new-house connecter may be used on old jobs but the wiring in the latter would have to be disconnected which is a disadvantage and for that reason I have provided two forms of the invention despite the fact that my old-house work connecter may be used equally well on new-house work. This latter fact really renders it unnecessary that I produce any more than one form of the device to wit, the old-house grounding connecter.

Figure 1:
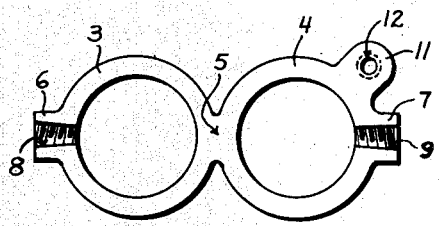
Figures 1, 2 and 3 show, respectively, one form of the grounding connecter before bending, a plan view of the connecter bent into finished form, and an end view of the connecter with the screws removed. This full-circular ring-like grounding connecter is primarily for new-house work.
Figure 2:
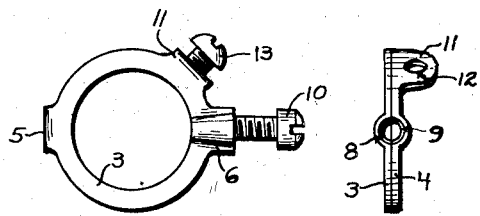
Figure 3:
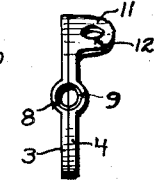

As previously mentioned the new-house work grounding connecter is ring formed and the blank is cut from sheet metal as shown in Figure 1. It consists of a pair of rings 3 and 4 which are integral with each other, being joined by a neck 5. Each ring is provided, at a point substantially opposite from the neck, with lugs 6 and 7 in each of which a half of a tapered and stamped screw threaded hole 8 and 9 is provided. The rings are then bent together along the neck 5 as a bending axis so that the two halves of the threaded tapered hole 8 and 9 coincide to form a split tapered and threaded hole 8—9. A screw 10 is screwed into the hole and as it is threaded further into the tapered hole the ring plates 3 and 4 are spread or forced apart at a point about opposite the hinge neck 5 as a bending axis.

Upon one of the rings, say the part 4, adjacent the screw hole 8—9 is provided an ear 11 having a screw threaded hole 12 therein. This ear 11 is bent at about right angles to the plane of the ring. The hole 12 is threaded to receive a wire-clamp screw 13 which is screwed down onto a separate grounding wire w which leads off from the box B to some suitable ground and by which the box assembly is positively connected to the earth through an independent ground wire w.

The new-house work grounding connecter 3—4 is pushed over the end of the pipe or other box assembly structure to the box wall and the bushing nut 2 is screwed up until it engages the connecter or it may even be left slightly spaced therefrom. The screw 10 is now screwed into the tapered threaded hole which spreads the plates 3 and 4 apart so that they forcibly engage the box B and the end of the pipe-bushing nut 2. This forcible engagement of the grounding connecter with the box wall and a box assembly anchorage means or nut insures a positive electrical contact between the outlet box and conduit pipe and insures also a rigid physical connection which is practically impossible to loosen.

Figure 6:
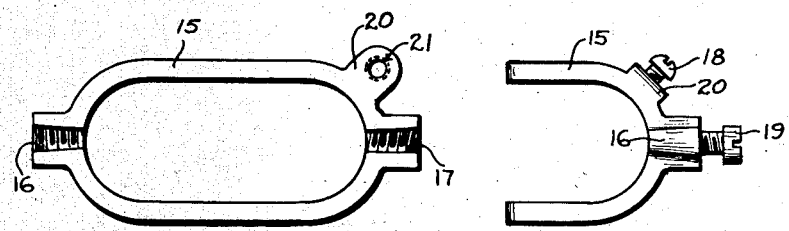
Figures 6 and 7 show, respectively, first a modified form of the grounding connecter used for old-house work and before bending into final form, and second the connecter bent into finished form with its operating screw mounted in place.
Figure 7:
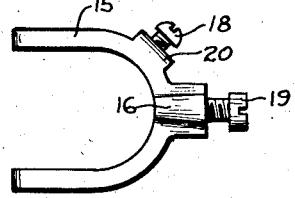

In Figures 6 through 8 a different form of ground connecter is shown which operates upon the same principle as the connecter described above and shown in Figures 1 through 5. This modified form of connecter however is somewhat more convenient to use and is particularly well adapted for use in establishing a grounding connection in old house wiring installations. The connecter is particularly adapted for this purpose due to the fact that it may be inserted between the box wall and one of the anchorage nuts without removing the nuts from the end of the conduit pipe or other box assembly structure and without disconnecting the wires of the cable from the lighting or other fixture. This second form of connector may be used equally well on both new and old house work rendering unnecessary the production of the former connector 3—4.

This second connecter is made from an elongated ring or oval shaped ring 15 also punched from sheet metal having half of a tapered and screw threaded hole 16 and 17 impressed, stamped or formed in the face of the ring at each end. The oval ring is bent upon itself so that the two halves of the tapered-threaded hole 16—17 coincide to form a threaded hole which is adapted to receive an operating screw 19. The oval-shaped ring when bent into its finished form consists then of two U-shaped plates hingedly connected at the ends of the U-shaped member. A projection or ear 20 having a threaded hole 21 extends from one end of the ring adjacent the threaded hole. This projection is adapted to receive a screw 18 which is tightened down upon a separate ground wire w which leads off and connects with the earth or ground to carry away any potential which otherwise might jump between loose box parts.

The latter and important form of grounding connector may be inserted into service position on old-house wiring installations merely by unscrewing the conduit nuts sufficiently to insert the connecter between the box wall and the end of the nut with the arms 15 of the connecter straddling the pipe. The lock nuts are then screwed up against the connecter and the screw 10 is next threaded into the tapered hole 16—17 which spreads the plate 15 apart to forcibly engage one plate against the box wall and the other against the end of the conduit nut 2. A positive electrical bond is then effected thereby eliminating arcing in case short circuiting occurs or if for any reason current is present in the pipe or box assembly, and the connecter also establishes a tight or rigid anchorage between the parts so that loosening of any part is avoided. It is obvious that the connecter may be used on new work as well as old and is inserted in the same manner in either case.

My invention in the connecter 4—5 therefore is capable of use for new wiring installations although it may be used for old installations as well by disconnecting the wiring not shown. In another form, as 15, it is particularly suited for reconditioning old, worn and defective installations but is also equally well suited for new installations. Both forms however operate upon the same principle, namely, a pair of substantially flat plates 3 and 4 or 15 placed adjacent to each other and which are adapted to be forcibly separated or pushed apart by an operating means until one of the plates positively engages an anchorage nut and the other plate positively engages the box wall. Such positive connection insures a good electric bond which eliminates arcing in case of a short circuit in the system and thereby considerably reduces or eliminates the fire hazard. The connecter further insures a rigid physical connection so that looseness in the pipe anchorage to the box does not occur.

Although I have shown two examples of the invention, the principles disclosed are capable of further uses and it is to be understood that I do not limit myself to the particular form shown, as a matter of fact the clamp screw ears 11 and 20 may or may not be used as local regulations may require for oftentimes it is not required that an independent grounding wire w be used.

It is now apparent that I have produced a grounding connecter embodying a single stamping which is folded on itself and provided with stamped-screw threads to receive a spreading screw, and the screw-threaded hole or the screw is tapered for the purpose of wedging open the proximate plates. The screws 10 and 19 wedge open the grounding connecter which applies a longitudinal force against the nut 2 and results in pulling the pipe with great force into the box and hence jams the nut 1 against one side of the box wall and the connecter plates 24 and 15 seat with equal force on the other side of the box wall. The cylindrically shaped screw fitted into the tapered-threaded hole provides engagement of relatively few threads but there is no tendency to strip the threads because the action is a spreading one and not an axial or longitudinal force on the screw.

The bushing nut 2 and lock nut 1 may be referred to as lock nuts if desired since their purpose is in fact to anchor the pipe P in the box hole H. Any suitable pipe anchorage means may be used other than the means 1—2 shown.

What I claim is:

1. A grounding connecter for outlet box assemblies comprising a plate bent upon itself forming a pair of adjacent sections hingedly secured together at the bending axis, and means to forcibly spread the plates apart.

2. A grounding connecter for outlet box assemblies comprising an elongated ring having half of a tapered threaded hole at each end and bent upon itself so that the two halves of the threaded hole coincide to form a split tapered and screw threaded hole and to form a pair of plates having a pair of parallel arms which are joined at their ends, and a screw threaded into the hole to forcibly spread the plates apart.

3. A grounding connecter for outlet box assemblies comprising a pair of substantially flat plates having their faces adjacent to each other, arms extending therefrom forming a transverse passage through the plates, said arms being hingedly connected at their ends and means to forcibly spread the plates apart.

4. A grounding connecter for outlet box assemblies comprising a pair of rings hingedly connected together, and operating means to forcibly spread the rings apart.

5. A grounding connecter for outlet box assemblies comprising two rings joined together at a point on their periphery forming a bending axis upon which the rings are bent upon themselves forming two adjacent rings, a hinge formed by said bending axis upon which the rings hinge, and means to forcibly spread the rings apart.

6. A grounding connecter for outlet box assemblies comprising two rings joined together at a point on their periphery forming a bending axis upon which the rings are bent upon themselves forming two adjacent rings, a hinge formed by said bending axis upon which the rings hinge, half a taper threaded hole formed upon each ring so that the two halves come together to form a split tapered and screw threaded hole, and a screw threaded into the hole to force the rings apart.

In testimony whereof I affix my signature.

BASIL J. YANCHENKO.